United States Patent
Bissessur et al.

(10) Patent No.: US 6,931,457 B2
(45) Date of Patent: *Aug. 16, 2005

(54) METHOD, SYSTEM, AND PROGRAM FOR CONTROLLING MULTIPLE STORAGE DEVICES

(75) Inventors: Sailesh Bissessur, Phoenix, AZ (US); David R. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 10/205,664

(22) Filed: Jul. 24, 2002

(65) Prior Publication Data

US 2004/0019709 A1 Jan. 29, 2004

(51) Int. Cl.[7] .............................................. G06F 13/20
(52) U.S. Cl. ............................... 710/14; 710/3; 710/8; 710/9
(58) Field of Search .............................. 710/3, 8, 9, 14; 711/114

(56) References Cited

U.S. PATENT DOCUMENTS

| | | | |
|---|---|---|---|
| 4,535,404 A | | 8/1985 | Shenk |
| 5,347,636 A | * | 9/1994 | Ooi et al. ................... 711/203 |
| 5,671,368 A | * | 9/1997 | Chan et al. ................. 710/301 |
| 5,729,760 A | * | 3/1998 | Poisner .......................... 710/3 |
| 5,835,738 A | * | 11/1998 | Blackledge et al. ........ 710/307 |
| 5,838,932 A | | 11/1998 | Alzien |
| 5,928,338 A | * | 7/1999 | Lawman ........................ 710/8 |
| 5,958,022 A | * | 9/1999 | Wilhelm, Jr. ................ 710/14 |
| 6,081,863 A | * | 6/2000 | Kelley et al. ............... 710/312 |
| 6,094,699 A | * | 7/2000 | Surugucchi et al. ........ 710/314 |
| 6,118,938 A | * | 9/2000 | Lawman et al. .............. 716/16 |
| 6,148,355 A | * | 11/2000 | Mahalingam ................ 710/104 |
| 6,233,641 B1 | | 5/2001 | Graham et al. |
| 6,275,876 B1 | | 8/2001 | Valk et al. |
| 6,499,074 B1 | * | 12/2002 | Mehta et al. ................ 710/104 |
| 6,536,014 B1 | * | 3/2003 | McClannahan et al. ........ 716/1 |
| 2002/0138709 A1 | * | 9/2002 | Ball et al. .................... 711/211 |
| 2002/0156944 A1 | * | 10/2002 | Benhase et al. ............... 710/8 |
| 2002/0170951 A1 | * | 11/2002 | Oshins et al. ............... 235/375 |
| 2003/0154341 A1 | * | 8/2003 | Asaro et al. ................ 710/306 |
| 2003/0158993 A1 | * | 8/2003 | Moy .......................... 710/306 |
| 2003/0191872 A1 | * | 10/2003 | Barth et al. .................... 710/8 |
| 2004/0019707 A1 | * | 1/2004 | Bissessur et al. .............. 710/3 |
| 2004/0024950 A1 | * | 2/2004 | Surugucchi ................. 710/316 |

FOREIGN PATENT DOCUMENTS

WO    WO 02/073420    9/2002

OTHER PUBLICATIONS

Highpoint RocketRaid 1820 8–Channel PCI–X Serial ATA RAID Host Adapter, copyright 2003.*
IP.COM Prior Art Database, IPCOM00008128D, Method for changing the context of a PCI functions address space via a control register, May 20, 2002.*
Marvell News Release, "Marvell Intrroduces the Industry's First PCI–X 8–Port Serial ATA Controller Solution for Enterprise Storage Applications". Sep. 9, 2002.□□.*
Marvell Serial ATA Host Controller Solutions, 88SX6041/88SX6081, copyright 2003.*

(Continued)

Primary Examiner—Fritz Fleming
(74) Attorney, Agent, or Firm—Rabindranath Dutta; Konrad Raynes & Victor LLP (57) ABSTRACT

Provided are a method, system and article of manufacture for controlling one or more I/O devices coupled to a local bus. A local bus function is associated with the one or more I/O devices. A register corresponding to the local bus function is configured as a memory address. The one or more I/O devices are controlled via the configured register.

21 Claims, 4 Drawing Sheets

OTHER PUBLICATIONS

Marvell Serial ATA Host Controller Solutions, 88SX5080/88SX5040/88SX5041, copyright 2003.*

Intel 31244 PCI–X to Serial ATA Controller, copyright 2004.*

IBM Technical Disclosure Bulletin, Jan. 1, 1994, vol. 37, Issue No. 1, pp. 317–318. "Switchable Mapping of I/O Card Registers into I/O or Memory Space".*

Anderson, Don and Tom Shanley, *PCI System Architecture*, Fourth Edition, 1999, pp. I–xlii, 1–6, 143–151, 351–409, Addison–Wesley, Boston.

APT Technologies, Inc., "Serial ATA: High Speed Serialized AT Attachment", Revision 1.0, Aug. 29, 2001, pp. 1–7, 23–36.

Hosler, Brad, "Programming Interface for Bus Master IDE Controller", [online], Revision 1.0, May 16, 1994, pp. 1–6. Retrieved from the Internet at <URL: http://www.bswd.com/idems100.pdf>.

"PCI IDE Controller Specification", [online], Revision 1.0, Mar. 4, 1994, pp. 1–5. Retrieved from the Internet at <URL: http://www.bswd.com/pciide.pdf>.

PCI Special Interest Group, "PCI Local Bus Specification", *PCI Local Bus*, Revision 2.2, Dec. 18, 1998, pp. i–xx, 1–6, & 189–220.

PCI International Search Report, Dec. 15, 2003, for International Application No. PCT/US 03/22943.

PCI International Search Report, Dec. 17, 2003, for International Application No. PCT/US 03/22784.

U.S. Appl. No. 10/205,546, filed Jul. 24, 2002, entitled "Method, System, and Program for Memory Based Data Transfer", invented by S. Bissessur & D. R. Smith.

* cited by examiner

METHOD, SYSTEM, AND PROGRAM FOR CONTROLLING MULTIPLE STORAGE DEVICES

BACKGROUND OF THE INVENTION

1. Field of the Invention

The present invention relates to a system, method, and program for controlling multiple storage devices.

2. Description of the Related Art

A local input/output (I/O) bus is a high-speed input/output (I/O) bus used for coupling peripheral devices, such as storage devices, to a computer system. The Peripheral Component Interconnect (PCI) bus and enhancements to the PCI bus, such as the PCI-X bus, are the commonly used I/O buses.

A PCI physical device is a physical device that may be coupled to the PCI bus. Each PCI physical device may incorporate from one to eight separate PCI functions. A PCI function may be a logical device. Each PCI function may include a configuration header that may be configured to control peripheral devices coupled to the PCI bus. The configuration header may include configuration registers, such as base address registers. Six base address registers comprising base address register 0 (BAR0), base address register 1 (BAR1), base address register 2 (BAR2), base address register 3 (BAR3), base address register 4 (BAR4), base address register 5 (BAR5) may be present in the configuration header. Each base address register may be 32 bits, i.e., a dword. Further details of the PCI bus (i.e., the PCI specification) are described in the publication entitled "PCI Local Bus Specification" by the PCI Special Interest Group (Revision 2.2, Copyright 1992, 1993, 1995, 1998 PCI Special Interest Group) and base address registers are described in Chapter 6 of the PCI specification.

A device adapter, such as a host bus adapter (HBA), may act as the interface between the PCI/PCI-X bus and the storage devices. The interface can control the transfer of data from a computer to a storage device and vice versa. Interfaces for storage disks include the Integrated Drive Electronics (IDE) interface (known also as an Advanced Technology Attachment interface, i.e., ATA, interface) and the Serial ATA (SATA) interface. Further details of SATA are described in the publication entitled "Serial ATA: High Speed Serialized AT attachment" by the Serial ATA Working Group (Revision 1.0, Copyright 2001). Technologies analogous to IDE/ATA such as the ATA packet interface (ATAPI) are available for CD ROM and DVD drives. The bandwidth and processing capabilities of the interface can substantially affect system performance, system configuration, system compatibility, system upgradability, etc.

A channel is typically the data pathway over which information flows in the IDE interface. As per the PCI IDE interface there may be two channels, primary channel and secondary channel, per PCI function. Furthermore, each channel can support at most two devices. For example, the primary channel can supports two IDE storage devices and the secondary channel can support two IDE storage devices. The configuration header of the PCI function may be configured to control four PCI IDE devices attached to the PCI bus. BAR0, BAR1, BAR2, BAR3 and BAR4 may be configured as I/O BARs. I/O BAR0 may be the command register block for the primary channel. I/O BAR1 may be the control register block for the primary channel. I/O BAR2 may be the command register block for the secondary channel. I/O BAR3 may be the control register block for the secondary channel. I/O BAR4 may provide control for bus master registers for both the primary channel and the secondary channel. BAR5 may be device specific, i.e., BAR5 is not part of the PCI IDE specification. Hence, a single PCI function can control at most four IDE storage devices via the two channels. Configuring the BARs as I/O BARs for PCI IDE is described in the publication entitled "PCI IDE Controller Specification" (Revision 1.0, 1994) in pages 1–5.

Although in the prior art PCI IDE/ATA has been used for supporting peripheral devices, there is a need in the art for improved techniques for controlling peripheral devices in a local I/O bus architecture with interfaces such as the SATA.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Described embodiments of the invention provide techniques to allow a single PCI function to control more than four ATA/ATAPI/SATA devices. Additional embodiments of the invention enable a switch between a PCI IDE mode in which no more than four devices can be controlled using a single PCI function and a direct address mode in which more than four ATA/ATAPI/SATA devices can be controlled using a single PCI function.

Figure 1:
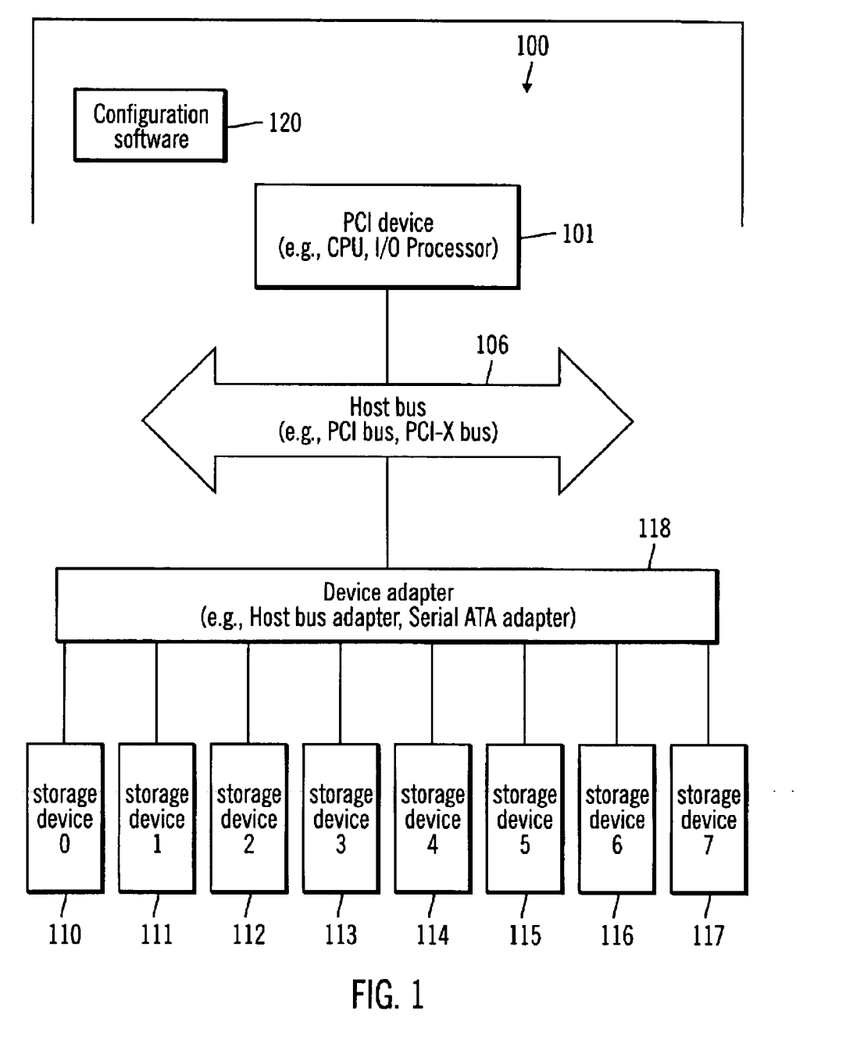
FIG. 1 illustrates a bus architecture for accessing data in storage devices in accordance with certain described embodiments of the invention.

FIG. 1 illustrates a system 100, including a bus architecture for accessing data in storage devices, such as SATA storage devices, in accordance with embodiments of the invention. A PCI device, such as a central processing unit (CPU) or an I/O processor, 101 is coupled to a host bus, such as a PCI (or a PCI-X) bus 106. The CPU may be any CPU known in art such as the INTEL x86 family of microprocessors, the PowerPC processor, etc. The I/O processor may comprise any I/O processor known in the art such as the INTEL 80321 or the INTEL 80310.

** Intel is a registered trademark of Intel Corporation. PowerPC is a registered trademark of IBM Corporation.

Eight storage devices, such as storage devices 110 . . . 117 are coupled to the PCI bus 106 via a device adapter, such as an Serial ATA (SATA) adapter, 118. The storage devices 110 . . . 117 may be any type of storage device known in the art, such as an SATA, ATA, ATAPI, etc., type of storage devices. The device adapter 118 may be any type of device adapter known in the art, such as SATA, ATA, ATAPI, etc., type of storage adapters. While eight storage devices 110 ... 117 are shown, a lesser or greater number of storage devices may be connected to the PCI bus 106 via the device adapter 118.

The device adapter 118 couples each of the eight storage devices 110 ... 117 to the PCI bus 106 with their own respective cables in a point-to-point fashion. Thus each of the eight storage devices 110 ... 117 may transfer data simultaneously in a direct access mode.

Configuration software 120 can configure the system 100 such that the devices 110 ... 117 can exchange data via the PCI bus 106. The configuration software 120 may be part of a BIOS, be part of a standalone software module, be part of device drivers resident on the system 100, be coupled to the PCI device 101, etc.

Figure 2:
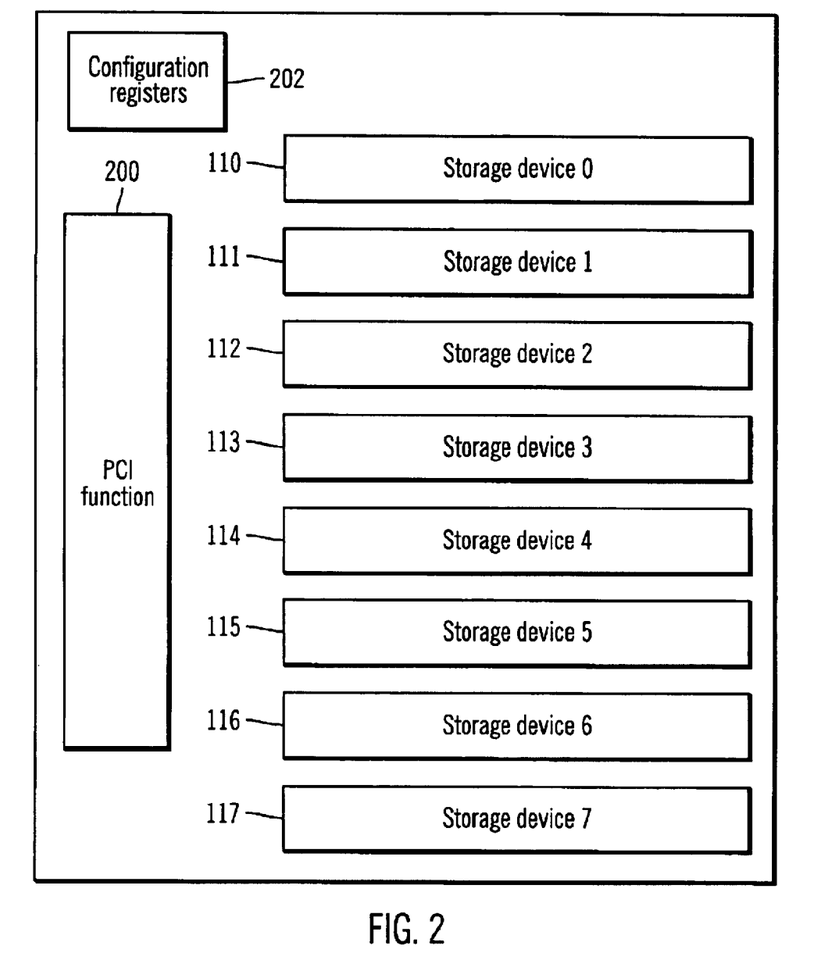
FIG. 2 illustrates a block diagram for a PCI function for devices in accordance with certain described embodiments of the invention.

FIG. 2 illustrates a block diagram indicating a representative number of storage devices controllable by a single PCI function 200 corresponding to the system 100, in accordance with embodiments of the invention. In FIG. 2, the single PCI function 200 can control the eight storage devices 110 ... 117 in accordance with embodiments of the invention. In alternative embodiments of the invention a lesser or a greater number of devices may be controllable by the single PCI function 200. The PCI function 200 implements a base set of configuration registers 202 defined in chapter 6 of the PCI specification. The configuration registers 202 are part of a configuration space (not shown in FIG. 2) that are associated with the PCI function 200 as per the PCI specification. The embodiments of FIG. 1 and FIG. 2 may allow for more than four devices to be simultaneously coupled to the PCI bus per PCI function. Furthermore because of the point-to-point connectivity of the storage devices 110 ... 117, each of the storage devices 110 ... 117 can transfer data simultaneously.

The PCI device 101 may possess the ability to address two distinct address spaces: I/O and memory. The PCI device 101 use PCI I/O and memory transactions to access PCI I/O and memory locations, respectively. In addition, a third access type, the configuration access, is used to access a device's configuration registers. The configuration registers 202 of the PCI function 200 may be initialized at the reset time of system 100 to configure the PCI function 200 to respond to memory and I/O address ranges assigned to the PCI function by the configuration software 120.

When a system, such as system 100 is reset, configuration software, such as the configuration software 120, scans the various buses in the system 100 to determine what devices exist and what configuration requirements they have. The process is referred to as "scanning the bus" or "walking the bus." The configuration registers 202 (illustrated in FIG. 2) defined in Chapter 6 of the PCI specification are implemented in order to facilitate this process.

Figure 3:
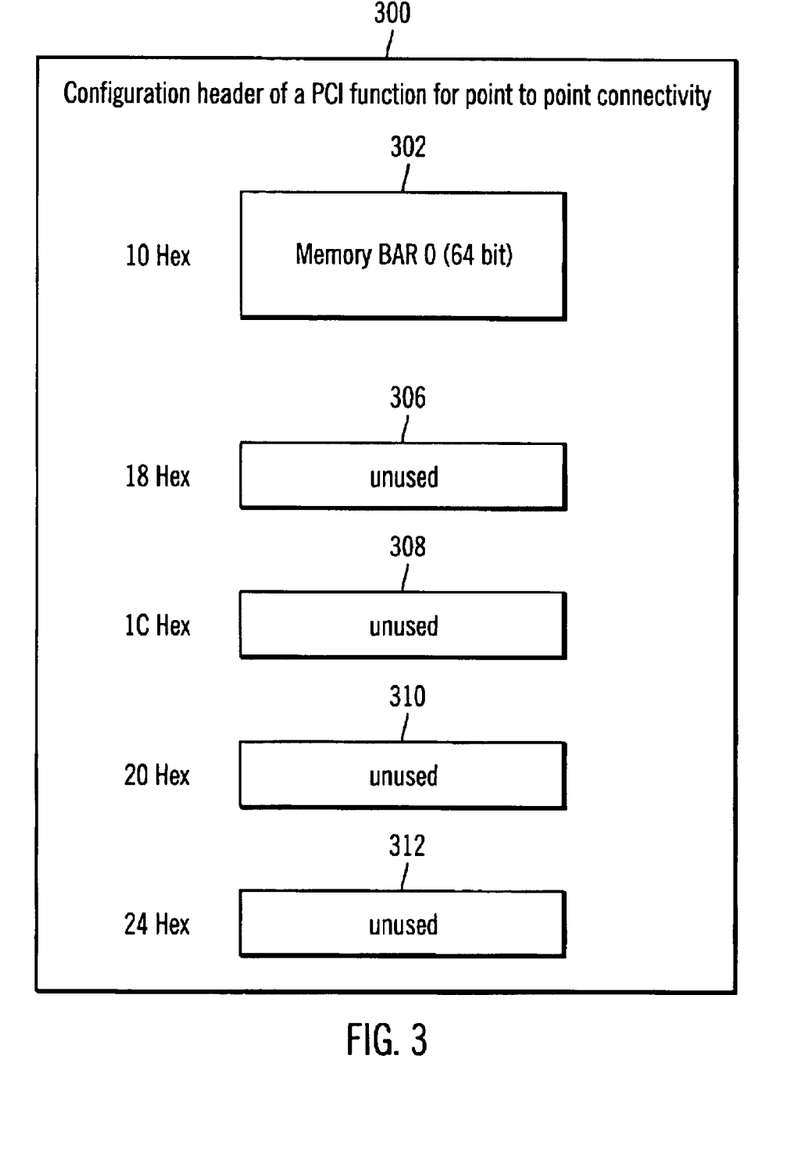
FIG. 3 illustrates a block diagram of a configuration header of a PCI function for point-to-point connectivity in accordance with certain described embodiments of the invention.

FIG. 3 illustrates a configuration header 300 of the PCI function 200 for point to point connectivity of the storage devices 110 ... 117 to the PCI bus 106, in accordance with certain embodiments of the invention.

In FIG. 3, the two 32-bit base address registers BAR0 and BAR1 are together configured as a 64 bit memory base address register (memory BAR indicated by reference numeral 302) starting at address 10 hex. In alternative embodiments a different starting address different from 10 hex can be used to store the memory BAR 302. In FIG. 3, the dwords 306, 308, 310, 312, corresponding to the base address registers BAR2, BAR3, BAR4, and BAR5 respectively, may be left unused. The register set of the storage devices 110 ... 117 may be mapped into memory space by the memory BAR 302. In certain embodiments the memory BAR 302 may be 64 bits long, and may locate an address in a $2^{64}$ bit memory space, wherein areas of the memory space correspond to regions used to control the storage devices 110 ... 117. The storage devices 110 ... 117 may be controlled by accessing the memory space.

Therefore, the memory BAR 302 implements a "programmable memory decoder" in the PCI function 200. The configuration software 120 can assign a 64-bit memory address within the memory space to the memory BAR 302. Since the memory BAR 302 may be 64 bits long the total amount of addressable memory may be $2^{64}$ bytes, which is large enough to map the register set of the storage devices 110 ... 117. In one embodiment of the invention, the amount of memory space required to control each of the storage devices 110 ... 117 is at most 512 bytes. With 512 bytes per storage device, the number of storage devices, such as storage disks, that may be connected to the PCI bus 106 via the use of the memory BAR 302 is significantly greater than four. In alternative embodiments, the amount of memory space required to control each storage device 110 ... 117 is a greater or lesser number of bytes. The number of bytes required per storage device is guided by the capabilities needed to control each device and is a function of the feature set to be supported for each device. In view of the large addressable space in the memory BAR 302 and the relatively small number of bytes required per storage device, the number of storage devices that can be supported simultaneously in embodiments of the invention for SATA connectivity is very large. Hence, embodiments of the invention provide configuration mechanisms such that the system 100 is able to convert accesses initiated by a CPU or an I/O processor comprising the PCI device 100, with certain predefined addresses into configuration access on the PCI bus 106, where more than four ATA/ATAPI/SATA devices are connected to the PCI bus 106.

Figure 4:
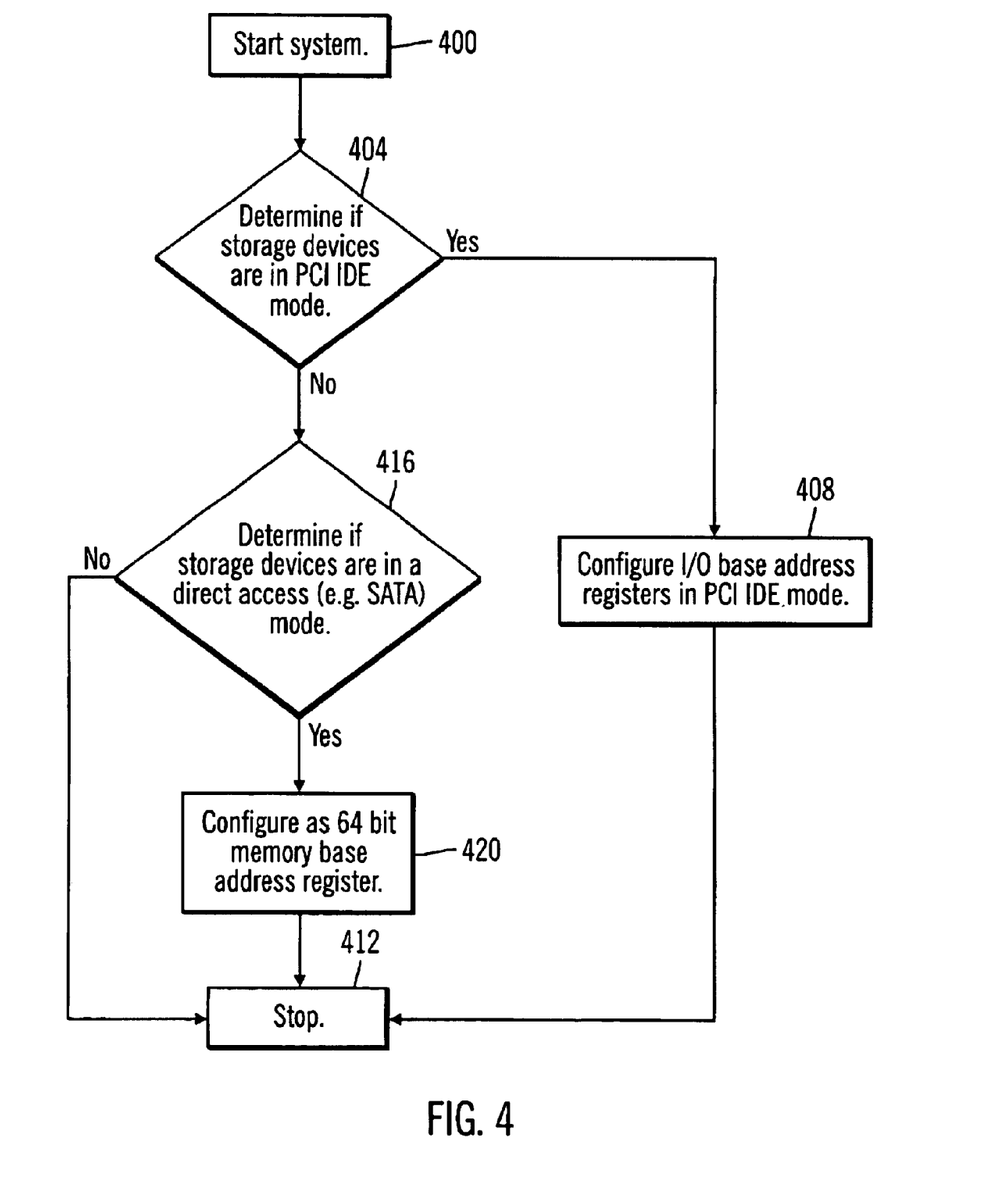
FIG. 4 illustrates logic for controlling storage devices attached to a local bus in accordance with certain described embodiments of the invention.

FIG. 4 illustrates logic for controlling storage devices attached to the local bus 106 in accordance with described embodiments of the invention. The logic described in FIG. 4 may be performed by configuration software, such as configuration software 120, where the configuration software 120 is coupled to a system in which storage devices may be connected to a local bus in either a point-to-point scheme such as in system 100 or in a prior art daisy chained scheme, such as in a PCI IDE mode.

At block 400, the system 300 is reset. Control proceeds to block 404, where the configuration software 120 determines whether storage devices attached to the system are in PCI IDE mode. If so, control proceeds to block 408 where the configuration software 120 configures the base address registers as I/O base address registers in a manner known in prior art and the process stops (at block 412).

If at block 404, the configuration software 120 determines that storage devices attached to the system are not in PCI IDE mode control proceeds to block 416 where configuration software 120 determines whether the storage devices connected to the PCI bus 106 are in a direct access mode (i.e., the storage devices are connected to the PCI bus in a point-to-point scheme, e.g., in a SATA mode). If so, the configuration software 120 configures (at block 420) the base address registers 302 ... 312 as the memory BAR 302 as described in FIG. 3, and the process stops (at block 412). As a result of configuring the memory base address register 302, more than four devices, such as the storage devices 110 ... 117, can be attached to the PCI bus 106 in a point-to-point manner. If at block 416, the configuration software 120 determines that the storage devices are not in a direct access mode the process stops (at block 412).

The logic described in FIG. 4 enables the operation of the system 100 in either the PCI IDE mode or in the mode where more than four ATA/SATA type devices can be attached to the PCI bus. The logic of FIG. 4 implements an interface where the single PCI function 200 can control the eight storage devices 110 . . . 117.

Block 408, implements a configuration to control IDE/ATA devices using a PCI function, which requires the IDE/ATA devices be mapped to I/O space. This means that up to four IDE/ATA devices (or ATAPI or SATA) can be controlled simultaneously using a single PCI function. Described embodiments further provide a programming interface, utilizing memory space, which allows the control of more than four IDE/ATA/ATAPI/SATA devices using a single PCI function. Being able to use only a single PCI function versus multiple functions, reduces the amount of hardware required. Additional embodiments of the invention enable a switch between a PCI IDE mode in which no more than four devices can be controlled using a single PCI function and a direct address mode in which more than four I/O devices can be controlled using a single PCI function.

Additional Embodiments

The operations described herein may be implemented as a method, apparatus or article of manufacture using standard programming and/or engineering techniques to produce software, firmware, hardware, or any combination thereof. The term "article of manufacture" as used herein refers to machine readable instructions or logic implemented in hardware logic (e.g., an integrated circuit chip, Programmable Gate Array (PGA), Application Specific Integrated Circuit (ASIC), etc.) or a machine readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessible and executable by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described embodiments, the storage devices communicate on a bus topology, such as a PCI-X or PCI bus topology. In alternative embodiments, the storage devices may communicate using any communication architecture known in the art. Alternative embodiments may use interfaces other than IDE, ATA, SATA or ATAPI.

In PCI bus embodiments, additional PCI-X or PCI bridges may be used. In certain embodiments, the storage devices comprised magnetic hard disk drives. In alternative embodiments, the storage devices may comprise any storage device known in the art, such as optical disks, tapes, CDROM drives, DVDs etc.

In the embodiments the length of registers have been illustrated with a certain number of bits. In the embodiments, if the host bus is a PCI bus, then each base address register is 32 bits wide if the base address register is an I/O decoder and may be either 32 bits or 64 bits wide if the base address register is a memory decoder. If the host bus 106 is a PCI-X bus, then each base address register is 32 bits wide if the base address register is an I/O decoder and 64 bits wide if the base address register is a memory decoder. In alternative embodiments the length of the base address registers may have a different number of bits.

The logic of FIG. 4 describes specific operations occurring in a particular order. In alternative embodiments, certain of the logic operations may be performed in a different order, modified or removed. Morever, steps may be added to the above described logic and still conform to the described embodiments. Further, operations described herein may occur sequentially or certain operations may be processed in parallel. Yet further, operations may be performed by a single processing unit or by distributed processing units.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for controlling one or more I/O devices connected to a local bus, comprising:

associating a local bus function with the one or more I/O devices;

if the one or more I/O devices are in a PCI IDE mode, configuring a register as an I/O address;

if the one or more I/O devices are in a direct access mode, configuring the resister corresponding to the local bus function as a memory address, wherein a switching is allowed between the PCI IDE mode and the direct access mode, wherein more than four I/O devices are capable of being controlled by using a single local bus function in the direct access mode, and wherein no more than four I/O device are capable of being controlled by using the single local bus function in the PCI IDE mode.

2. The method of claim 1, wherein the memory address is coupled to a memory space, wherein the memory space maps control to the one or more I/O devices, and wherein the one or more I/O devices are controlled by accessing the memory space.

3. The method of claim 1, wherein the register is configured as a memory base address register, and wherein the memory base address register is 32 bits or 64 bits long.

4. The method of claim 1, wherein the register is stored in a configuration header of the local bus function.

5. The method of claim 1, wherein the local bus is a PCI bus and the local bus function is a PCI function.

6. The method of claim 1, wherein the register is stored in a configuration header of the local bus function, and wherein the register is configured as a memory decoder by configuring the register as a memory base address register.

7. The method of claim 1, wherein the register is stored in a configuration header of the local bus function, and wherein the register is configured as a I/O decoder by configuring the register as a I/O base address register.

8. The method of claim 1, wherein in the direct access mode the one or more I/O devices are storage devices connected in a point-to-point mechanism to the local bus, wherein in the direct access mode the one or more I/O devices comply with the SATA interface, wherein in the direct access mode a SATA adapter is directly connected to the local bus, and wherein in the direct access mode the one or more I/O devices are greater than four in number and are capable of simultaneously performing I/O transactions through the SATA adapter.

9. A system, comprising:
   a local bus;
   one or more I/O devices coupled to the local bus;
   a local bus function associated with the one or more I/O devices, wherein the local bus function is a PCI function; and
   a resister corresponding to the PCI function, wherein if the one or more I/O devices are in a PCI IDE mode the register is configured as in I/O address, and wherein if the one or more I/O devices are in a direct access mode the register is configured as a memory address, wherein a switching is allowed between the PCI IDE mode and the direct access mode, wherein more than four I/O devices are capable of being controlled by using a single local bus function in the direct access mode, and wherein no more than four I/O devices are capable of being controlled by using the single local bus function in the PCI IDE mode.

10. The system of claim 9, further comprising a host bus adapter, wherein the host bus adapter couples the one or more I/O devices to the local bus.

11. The system of claim 9, further comprising:
    a memory space, wherein the memory address is coupled to the memory space, wherein the memory space maps control to the one or more I/O devices, and wherein the one or more I/O devices are controlled by accessing the memory space.

12. The system of claim 9, wherein the register is configured as a memory base address register, and wherein the memory base address register is 32 bits or 64 bits long, and wherein the configured register functions as a programmable memory decoder.

13. The system of claim 9, further comprising:
    a configuration header coupled to the local bus function, wherein the register is stored in the configuration header, and wherein the register is configured as a memory decoder by configuring the register as a memory base address register.

14. The system of claim 9, further comprising:
    a configuration header coupled to the local bus function, wherein the register is stored in the local bus function, and wherein the register is configured as a I/O decoder by configuring the register as a I/O base address register.

15. The system of claim 9, wherein in the direct access mode the one or more I/O devices are storage devices connected in a point-to-point mechanism to the local bus, wherein in the direct access mode the one or more I/O devices comply with the SATA interface, wherein in the direct access mode a SATA adapter is directly connected to the local bus, and wherein in the direct access mode the one or more I/O devices are greater than four in number and are capable of simultaneously performing I/O transactions through the SATA adapter.

16. An article of manufacture for controlling one or more I/O devices connected to a local bus, wherein the article of manufacture is capable of causing operations, the operation comprising:
    associating a local bus function with the one or more I/O devices; if the one or more I/O devices are in a PCI IDE mode, configuring a register as an I/O address; and
    if the one or more I/O devices are in a direct access mode, configuring the register corresponding to the local bus function as a memory address, wherein a switching is allowed between the PCI IDE mode and the direct access mode, wherein more than four I/O devices are capable of being controlled by using a single local bus function in the direct access mode and wherein no more than four I/O devices are capable of being controlled by using the single local bus function in the PCI IDE mode.

17. The article of manufacture of claim 16, wherein the memory address is coupled to a memory space, wherein the memory space maps control to the one or more I/O devices, and wherein the one or more I/O devices are controlled by accessing the memory space, and wherein the configuring is performed by configuration software coupled to the local bus.

18. The article of manufacture of claim 16, wherein the configured register functions as a programmable memory decoder, wherein the register is configured as a memory base address register, and wherein the memory base address register is 32 bits or 64 bits long.

19. The article of manufacture of claim 16, wherein the register is stored in a configuration header of the local bus function, and wherein the register is configured as a memory decoder by configuring the register as a memory base address register.

20. The article of manufacture of claim 16, wherein the register is stored in a configuration header of the local bus function, and wherein the register is configured as a I/O decoder by configuring the register as a I/O base address register.

21. The article of manufacture of claim 16, wherein in the direct access mode the one or more I/O devices are storage devices connected in a point-to-point mechanism to the local bus, wherein in the direct access mode the one or more I/O devices comply with the SATA interface, wherein in the direct access mode a SATA adapter is directly connected to the local bus, and wherein in the direct access mode the one or more I/O devices are greater than four in number and are capable of simultaneously performing I/O transactions through the SATA adapter.

* * * * *

UNITED STATES PATENT AND TRADEMARK OFFICE
CERTIFICATE OF CORRECTION

| | | |
|---|---|---|
| PATENT NO. | : 6,931,457 B2 | Page 1 of 1 |
| APPLICATION NO. | : 10/205664 | |
| DATED | : August 16, 2005 | |
| INVENTOR(S) | : Sailesh Bissessur and David R. Smith | |

It is certified that error appears in the above-identified patent and that said Letters Patent is hereby corrected as shown below:

Column 6, Line 38, delete "resister" and replace with --register--.

Column 6, Line 44, delete "device" and replace with --devices--.

Column 7, Line 17, delete "resister" and replace with --register--.

Column 7, Line 19, delete "as in" and replace with --as an--.

Column 8, Line 10, delete "the operation" and replace with --the operations--.

Column 8, Line 19, delete "arc" and replace with --are--.

Column 8, Line 21, delete "mode and" and replace with --mode, and--.

Signed and Sealed this

Twenty-ninth Day of September, 2009

David J. Kappos
*Director of the United States Patent and Trademark Office*